United States Patent [19]

Bath

[11] Patent Number: 5,364,217
[45] Date of Patent: Nov. 15, 1994

[54] SYSTEM FOR MAINTAINING SECURITY OF FACSIMILE MESSAGES

[76] Inventor: Seymour Bath, Astro Systems 6 Nevada Dr., Lake Success, N.Y. 11040

[21] Appl. No.: 14,822
[22] Filed: Jan. 25, 1993
[51] Int. Cl.⁵ .............................................. B42C 9/00
[52] U.S. Cl. ..................... 412/37; 412/901; 283/101; 283/901; 462/900
[58] Field of Search ................ 283/94, 100, 101, 105, 283/902, 901; 412/33, 37, 901; 462/900

[56] References Cited

U.S. PATENT DOCUMENTS 5,001,749  3/1991  Iggulden et al. ...................... 283/117
5,085,467  2/1992  Castro ..................................... 283/94

Primary Examiner—Willmon Fridie
Attorney, Agent, or Firm—Edward H. Loveman

[57] ABSTRACT

A system for producing a laminated facsimile sheet assembly to cover and conceal a facsimile message on a message sheet comprises a supply of message sheet material which may be a roll of sheet material. A printing head is disposed to print a message on a section of the sheet material. A supply of cover sheet material is disposed to superimposed a cover sheet on the recorded sheet to the message sheet. The attachment means can be spots of pressure sensitive adhesive preapplied in a predetermined pattern to one side of the cover sheet. The over sheet can be part of a roll or one of a pile thereof; other sides of the cover sheets have slippery surfaces to prevent the cover sheets from sticking to each other in a pile. A cutter device can be disposed to cut the message sheets one at a time from the roll of message sheet material; or it can cut both the message sheets one at a time from the roll of message sheet material; or it can cut both the message sheet and superimposed cover sheet taken from a roll thereof. The attachment means can be staples or other attachment means in addition to or instead of the pressure sensitive adhesive spots. The supply of cover sheet material can be a roll with the pressure sensitive adhesive spots applied to one side of the sheet material. The other side of the sheet material will be slippery to prevent coils in the roll of cover sheet material from sticking to each other.

9 Claims, 3 Drawing Sheets

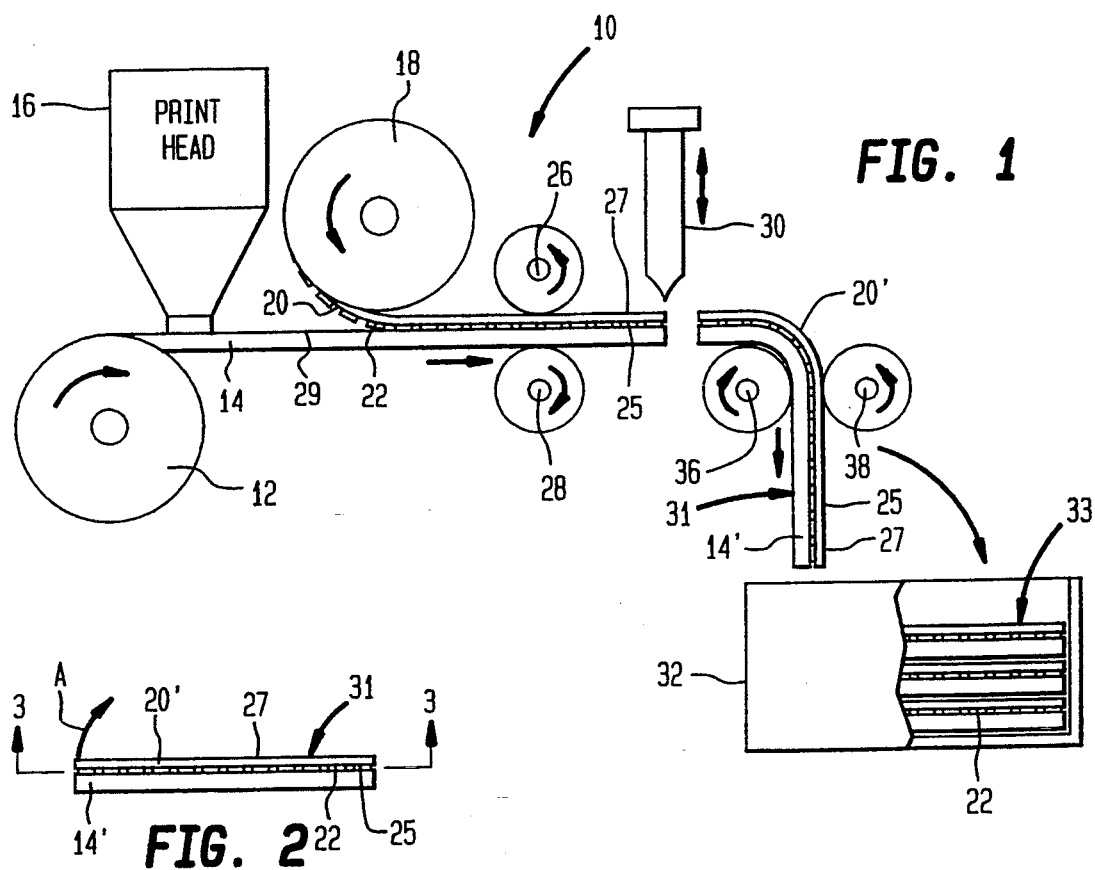
FIG. 1
FIG. 2
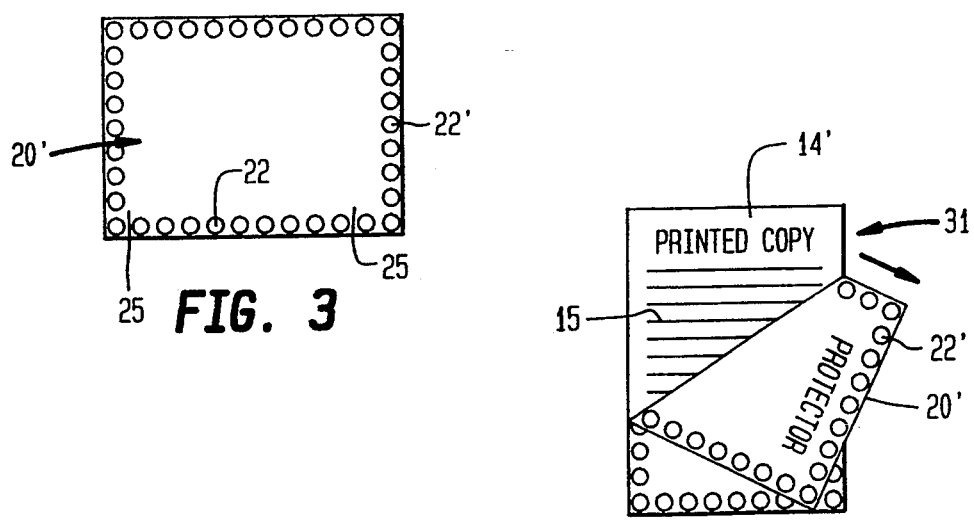
FIG. 3
FIG. 4

SYSTEM FOR MAINTAINING SECURITY OF FACSIMILE MESSAGES

BACKGROUND OF THE INVENTION

1. Field of Invention

This invention relates to a security system for facsimile transmission systems which electronically send facsimile messages to a receiver, and more particularly relates to a facsimile transmission system wherein the reproduced message frown the receiver is part of a laminated sheet assembly protect from unauthorized, casual reading by unauthorized persons.

2. Description of the Prior Art

It has been proposed heretofore to increase the security of facsimile messages sent electronically from a transmitter to a receiver. The prior methods have employed rather complex composite recording materials such as described in U.S. Pat. No. 5,001,749 and in U.S. Pat. No. 5,085,469. The prior systems are very expensive to operate because of the high cost of composite sheets on which the received messages are printed.

SUMMARY OF THE INVENTION

The present invention avoids the cost of complexity of the prior recording methods and systems, utilizing plain paper for recording the facsimile messages. As each sheet containing a message is recorded, the message is covered with a plain or plastic cover sheet which is removably attached to the message sheet by adhesive means, staples or other attachment means which are readily openable to expose the covered message.

It is therefore a principle object of the present invention to protect a recorded facsimile message frown being read by unauthorized persons.

It is another object of the present invention to provide a laminated assembly comprised of a recorded facsimile message sheet with a removable cover sheet which protects the message from casual or unauthorized reading by unwarrented persons.

Still another object of the present invention is to produce laminated sheets adhering to each other with an inside message side of one sheet covered by a cover sheet removably secured in place by spots of pressure sensitive adhesive or other attachment means.

According to the invention, in one embodiment, upon which the facsimile message is recorded is guided to pass underneath a cover sheet drawn from a roll above the recording sheet material. One side of the protective cover sheet has a multiplicity of spaced spots or areas of adhesive along opposite edges, and along spaced pair of lines extending transversely across the protective sheet. A cutter automatically cuts the cover sheet and attached recorded sheet into predetermined lengths. The double laminated sheets are then deposited one on the other in a suitable bin or receptacle.

In another form of the invention, the cover sheets are precut to desired lengths and stored in a pile. The cover sheets are then applied one at a time to the surface of the recorded sheet bearing the imprinted facsimile message. The recorded sheet is precut prior to applying the adhesive protector sheet thereto. The laminated sheets are then deposited automatically into a suitable bin or receptacle.

These and other objects and many of the attendant advantages of this invention will be readily appreciated as the same becomes better understood by reference to the following detailed description when considered in connection with the accompanying drawings in which:

BRIEF DESCRIPTION OF THE DRAWING

FIG. 1 is a side view partially diagrammatic in form of a facsimile receiving system system embodying the invention;

FIG. 2 is a side elevational view of a laminated facsimile sheet assembly according to the invention;

FIG. 3 is a horizontal sectional view taken along line 3—3 of FIG. 2;

FIG. 4 is a plan view of a laminated sheet assembly with cover sheet partially removed to expose a recorded message on the underlaying message sheet;

DESCRIPTION OF THE PREFERRED EMBODIMENT

Figure 5:
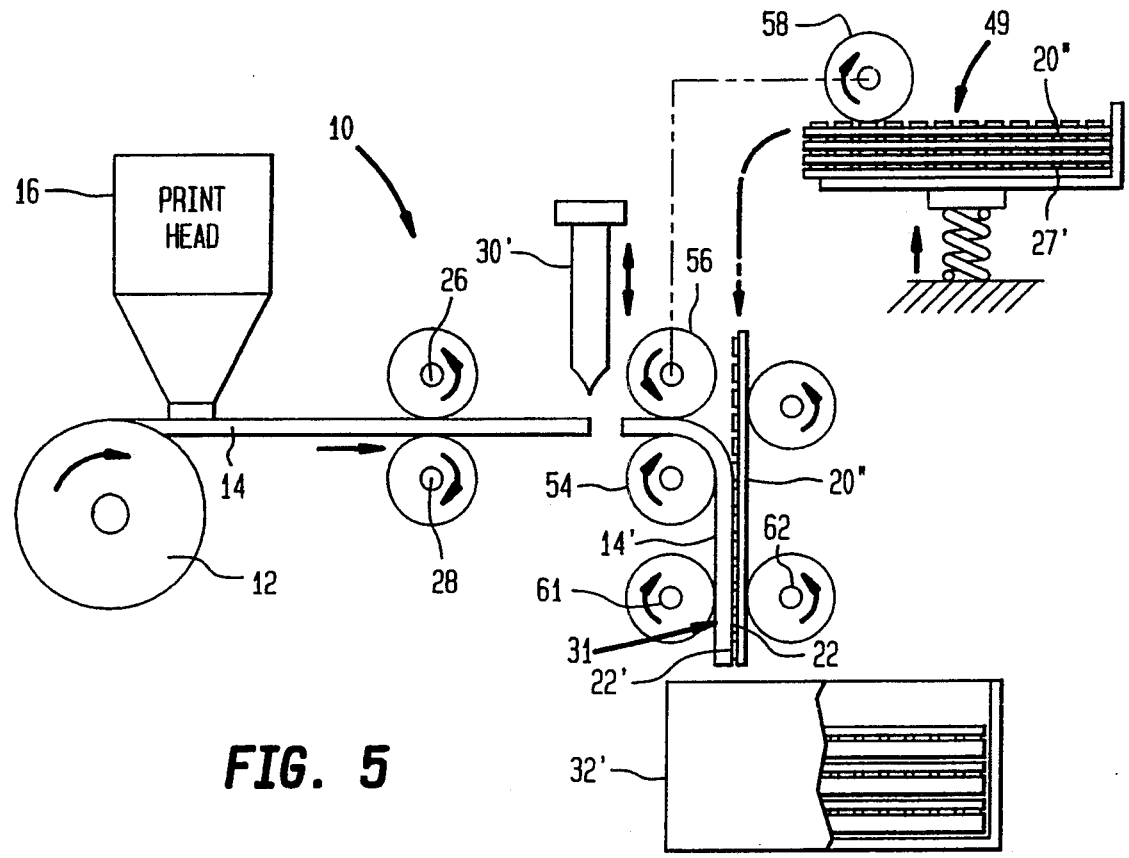
FIG. 5 is a side view partially diagrammatic in form of another facsimile receiving system in which the cover sheets are applied as a separate discrete sheet on each of the recorded message sheets.

Referring now to the drawings wherein like reference characters designate like or corresponding parts throughout, there is illustrated in FIG. 1, parts of a facsimile receiving system 10 comprising a feed roll 12 of a message recording paper sheet 14. A message 15 is shown in FIG. 4 printed by a print head 16 upon sheet 14 as it passes the print head 16. Just beyond the print head 16 is a roll 18 of opaque cover paper or plastic 20. As best shown in FIG. 3, the cover sheet 20 has spots of a pressure sensitive adhesive 22 on an underside 25 in a gridlike pattern along opposite traverse edges of the underside 25. Also transverse rows of adhesive spots 22 are applied at the spaced intervals along the underside 25 of the sheet 20. Rollers 26 and 28 adjacent each other above and below the sheet 20 press the two sheets 20 and 14 together so that the adhesive spots 22 and 22' adhere to an upper side 29 of the sheet 14. A cutter blade 30 a predetermined distance from the rollers 26, 28 cuts the double sheet to form a laminated sheet 31 of predetermined length. The sheet 31 drops into a bin 32 where a pile 33 of the sheets 31 is shown collected. A pair of rollers 36,38 at opposite sides of the laminated sheet 31 guide the sheet 31 into the bin 32.

FIG. 2 shows the laminated sheet assembly 31 in position to be disassembled The upper cover sheet 20' may be peeled frown the lower message sheet 14' as indicated by arrow A. In FIG. 4 the upper cover sheet 20' is shown being peeled from the message sheet 14' to reveal the message 15. Until the message sheet 14' is tincovered , the message 15 cannot be read by a casual or unauthorized person.

The upper side 27 of the cover sheet 20 has a slippery surface to prevent the coils of roll 18 from sticking to each other due to the presence of the preapplied adhesive spots 22 and 22'. The slippery surface can be a thin sprayed coating of wax or a very thin layer of plastic such as polyethylene fused to the sheet 20. In any event the adhesive spots 22, 22' will not adhere to the slippery surface of the side 27.

Generally the first page of the message identifies the sender and receiver, the sender and receiver's facsimile telephone number, the number of pages in the message, etc. In this event it is not necessary to use a cover sheet on the first page, which cover sheet may be easily eliminated by for example having the trailing edge of the first sheet trigger the rotation of the roll 18. In addition, although not illustrated, the print or upper side 29 of the message sheet 14 may contain the pressure sensitive adhesive 22 in any pattern or in the pattern hereinabove described for the cover sheet 20. In this case the cover sheet is no longer necessary and each sheet 14 after the first sheet 14 will adhere to the previous sheet 14 such that the entire message will form a composite stack when pressure is applied thereto.

In FIG. 5 parts of a system 10A corresponding to the system 10 are identically numbered. Thus, instead of employing a roll of cover sheeting, there is provided a pile or stack 49 of cover sheets 20″. On one side 25′ of each sheet 20″ is an array of adhesive spots 22, 22′ corresponding to those shown in FIGS. 2, 3 and 4. A cutter 30′ cuts only the message sheet 14 into sheets 14′ of predetermined, standard length. As each sheet 14′ passes between the rollers 54, 56 on opposite side of the sheet 14′ roller 58 on top of the stack 49 moves only the top cover sheet 20″ from the pile 49 into registering contact with the upper message side of the sheet 14′. In order to facilitate sliding the top cover sheet 20″ from the stack 49, a slippery side 27 of each cover sheet 20″ is precoated with a wax or 5 plastic coating. This prevents the adhesive spots 22, 22′ from sticking to the next lower sheet 20″ in the stack 46. The laminated sheets are guided by rollers 54, 61, 62 and fall into a bin 32′. The rollers 61, 62 press the sheets 20″ and 14′ together to form double sheet assembly 31′. The laminated sheet assembly can be disassembled as shown in FIGS. 2 and 4 to expose the printed message 15.

Figure 6:
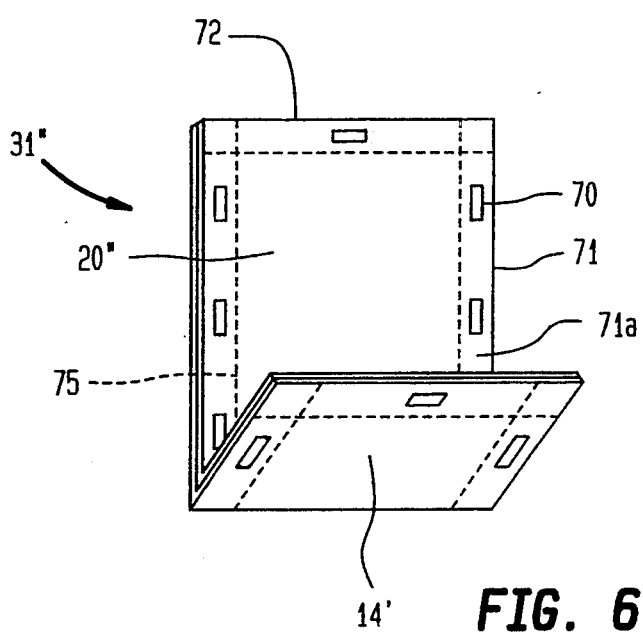
FIG. 6 is a perspective view of another laminated facsimile sheet assembly embodying a modification of the invention.
Figure 7:
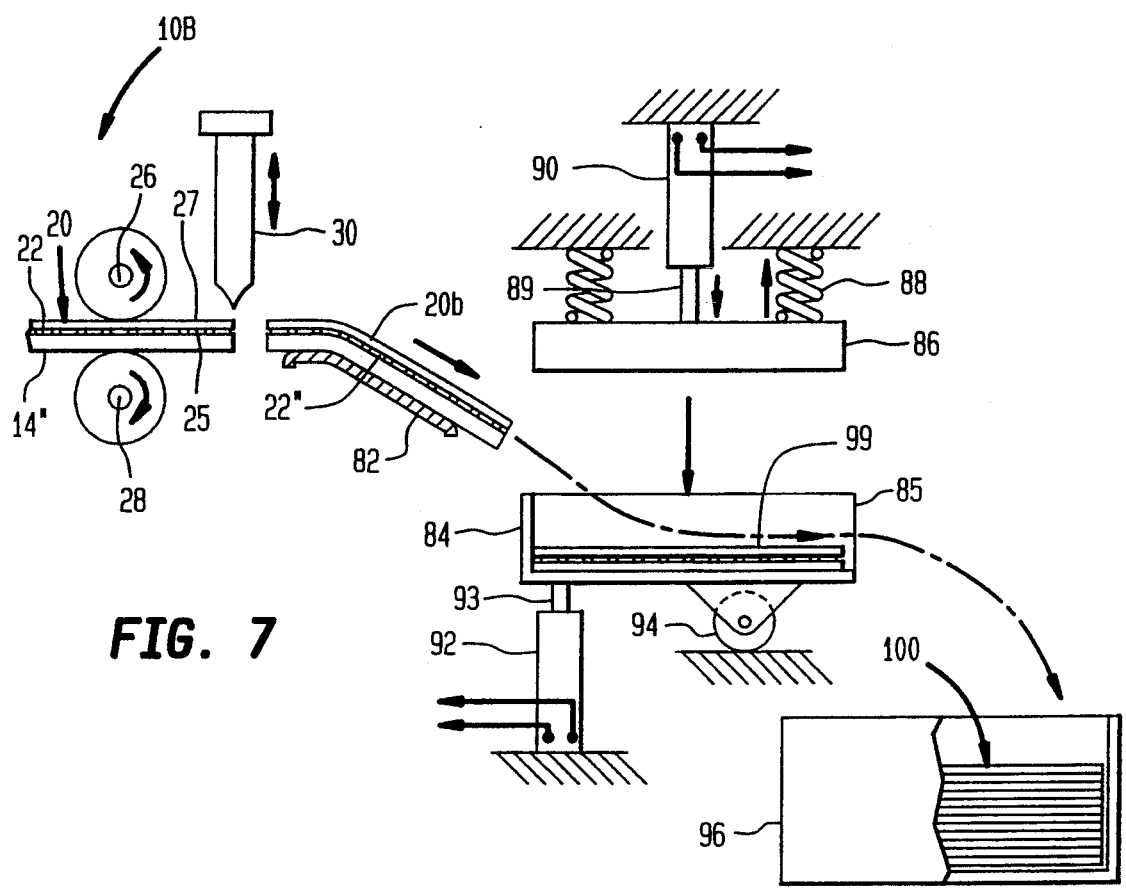
FIG. 7 is a side view partially diagrammatic in form, similar to FIG. 1, of a facsimile message stacking and binding system embodying another form of the invention.

Instead of using adhesive spots to attach the printed sheets and protective sheets together, other attachment means can be used such as staples or the like. Thus as shown in FIG. 6 staples 70 are applied at lateral and end edges 71, 72 of laminated assembly 31″. The staples hold the cover sheet 20″ to message sheet 14′. If desired the gridlike pattern of adhesive spots 20, 22′ shown in FIG. 3 and 4 can be used to supplement the staples in holding the laminate assembly together. Further, if desired perforations 75 can be provided near the edges 71 to define strips 71a. These strips can be torn off to release the cover sheet 20″ from the message sheet 14′. The foregoing means for holding the laminate assembly are clearly and easily adaptable to the stack of message sheets without cover sheets hereinbefore described.

It should be understood that the foregoing relates to a limited number of preferred embodiments of the invention which have been by way of and that it is intended to cover all changes and modifications of the examples of the invention herein chosen for the purpose of the disclosure, which do not constitute departures from the spirit and scope of the invention.

What is claimed:

1. A system for producing a laminated facsimile sheet assembly and conceal a facsimile message on a message sheet, comprising:
   a supply of message sheet material;
   means for printing said message on one side of said sheet material to constitute a recorded message sheet;
   a supply of opaque cover sheet material;
   means for taking a cover sheet from said supply thereof and superimposing said cover sheet on said recorded message sheet to cover and conceal said message printed thereon;
   attachment means for removably attaching said cover sheet to said recorded message sheet and form a laminated assembly, so that said message is exposed when said cover sheet removed from said message sheet; and
   cutter means disposed for separating said laminated assembly of of said cover sheet an said message sheet from stud supplies thereof respectively.

2. A system as claimed in claim 1, wherein said attachment means comprise spots of pressure sensitive adhesive material applied to one side of said cover sheet.

3. A system as claimed in claim 2, wherein said spots are arranged in a gridlike pattern on said one side of said cover sheet.

4. A system as claimed in claim 2, wherein said spots are applied along edges of said message sheet.

5. A system as claimed in claim 1, comprising cutter means for separating a pile of precut rectangular cover sheets; and means for removing said precut cover sheet one at a time from said pile and for attaching one side of said cover sheet to said separately rectangular message sheet.

6. A system as claimed in claim 5, wherein said precut cover sheets have slippery other sides to prevent said cover sheets in said pile from sticking to each other.:

7. A system as claimed in claim 2, wherein said supply of cover sheet material is a roll thereof with said adhesive spots preapplied to said one side of said cover sheet material the other side of said sheet material having a slippery surface to prevent adjacent coils in said roll from sticking to each other.

8. A system as claimed in claim 1, where said attachment means comprises staple removably securing said cover sheet and said message sheet together.

9. A system as claimed in claim 8, wherein said attachment means further comprise spots of pressure sensitive adhesive material applied to one side of said cover sheet in predetermined pattern to supplement the holding force of said staples on said message sheet.

* * * * *